United States Patent
McConnell (10) Patent No.: US 7,406,324 B1
(45) Date of Patent: Jul. 29, 2008

(54) SYSTEM AND METHOD FOR CONTROLLING SERVICES PROVIDED TO MULTI-MODE MOBILE STATIONS

(75) Inventor: Von K. McConnell, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 308 days.

(21) Appl. No.: 11/101,236

(22) Filed: Apr. 7, 2005

(51) Int. Cl.
*H04Q 7/20* (2006.01)

(52) U.S. Cl. .............. 455/466; 455/435.1; 455/435.2; 455/436; 455/437; 455/438; 455/439; 455/440; 455/442; 455/443; 455/445

(58) Field of Classification Search ............... 455/435, 455/433, 432.1, 466, 435.1, 435.2, 436, 437, 455/438, 439, 440, 442, 443, 445; 456/560
See application file for complete search history.

(56) References Cited

U.S. PATENT DOCUMENTS

| | | | |
|---|---|---|---|
| 6,560,327 B1 | 5/2003 | McConnell | |
| 6,614,784 B1 | 9/2003 | Glitho et al. | |
| 6,711,417 B1 | 3/2004 | Gorman et al. | |
| 6,741,695 B1 | 5/2004 | McConnell et al. | |
| 6,795,444 B1 | 9/2004 | Vo et al. | |
| 2002/0075881 A1 | 6/2002 | Yoakum et al. | |
| 2002/0120746 A1 | 8/2002 | Patil et al. | |
| 2002/0191595 A1 | 12/2002 | Mar et al. | |
| 2003/0013489 A1 | 1/2003 | Mar et al. | |
| 2003/0026245 A1 | 2/2003 | Ejzak | |
| 2003/0027569 A1 | 2/2003 | Ejzak | |
| 2003/0027595 A1 | 2/2003 | Ejzak | |
| 2003/0133421 A1 | 7/2003 | Sundar et al. | |
| 2003/0134636 A1 | 7/2003 | Sundar et al. | |
| 2003/0134638 A1* | 7/2003 | Sundar et al. | ............... 455/435 |
| 2003/0134650 A1 | 7/2003 | Sundar et al. | |
| 2004/0105434 A1 | 6/2004 | Baw | |
| 2004/0146021 A1 | 7/2004 | Fors et al. | |
| 2004/0203788 A1 | 10/2004 | Fors et al. | |
| 2004/0204095 A1 | 10/2004 | Cyr et al. | |
| 2004/0240430 A1 | 12/2004 | Lin et al. | |
| 2005/0007984 A1* | 1/2005 | Shaheen et al. | ............. 370/338 |
| 2005/0130649 A1* | 6/2005 | Kirby | ...................... 455/432.1 |

OTHER PUBLICATIONS jNetX, "Open Convergent Feature Server," 2004.

Jose Soler Lucas, "A Report on the EU's IST Project Gemini," Global Communications Newsletter, Nov. 2004.

(Continued)

*Primary Examiner*—David Q Nguyen (57) ABSTRACT

A multi-mode mobile station includes a first interface for wireless communication with a wireless local area network (WLAN) and a second interface for wireless communication with a wireless wide area network (WWAN). An internetwork service control system controls how services are provided to the multi-mode mobile station via the WLAN and the WWAN. The same service logic in the internetwork service control system can control the provision of services via both the WLAN and the WWAN. For example, a service logic module can be executed to define SIP signaling to control the provision of a service via the WLAN and can be executed to define WIN signaling to control the provision of the same service via the WWAN. The internetwork service control system may also include a call state monitor that maintains the call state of the multi-mode mobile station via the WLAN and the WWAN.

11 Claims, 5 Drawing Sheets

OTHER PUBLICATIONS

Gemini Consortium, "IP-based Service Control Point (IP-SCP)," 2004.

Gemini Consortium, "Gemini Services in a converged PSTN & IP Intelligent Network Environment," 2004.

Lucent Technologies, "IP Multimedia Subsystem (IMS) Service Architecture," Jun. 2004.

* cited by examiner

SYSTEM AND METHOD FOR CONTROLLING SERVICES PROVIDED TO MULTI-MODE MOBILE STATIONS

BACKGROUND

1. Field of the Invention

The present invention relates to telecommunications and, more particularly, to a system and method for controlling how services are provided to multi-mode mobile stations.

2. Description of Related Art

There is an increased interest in using more diverse types of wireless access technologies for mobile devices. Different wireless access technologies may be used to provide wireless coverage in different geographic areas. In addition, different wireless access technologies may be used to provide different capabilities for transmitting and receiving voice, data, and/or other media. For example, wireless wide area networks (WWANs), which often use wireless access technologies such as CDMA, TDMA, or GSM, typically provide wireless coverage in relatively large geographic areas. However, in many cases, WWANs do not provide good wireless coverage in buildings. In addition, many WWANs have a relatively limited bandwidth for transmitting and receiving media. However, wireless local area networks (WLANs), which may use wireless access technologies, such as IEEE 802.11, Bluetooth, HiperLAN, or HomeRF, have been used to provide wireless coverage in more limited areas, such as the inside of buildings. In addition, WLANs can often transmit and receive media at a higher rate than many WWANs.

With this increased interest in using diverse wireless access technologies to provide wireless coverage has come an increased interest in providing multi-mode mobile stations that can communicate using more than one type of wireless access technology. For example, a multi-mode mobile station may have one interface for communication with a WWAN, using a wireless access technology such as CDMA, and another interface for communication with a WLAN, using a wireless access technology such as IEEE 802.11. When the multi-mode mobile station uses the WWAN to send or receive calls, the voice or other media for the call may be carried in a circuit-switched network, e.g., in a time domain multiplexed (TDM) format. When the multi-mode mobile station uses the WLAN to send or received calls, the voice or other media for the call may carried in a packet-switched network in a voice over Internet Protocol (VoIP) format.

Although such multi-mode mobile stations can provide better wireless communication in more areas by being able to communicate over different wireless networks, a number of challenges remain. In particular, many subscribers are accustomed to being able to use various "enhanced" services or features when communicating with the WWAN. Such services may include, for example, "Class 5 features," such as abbreviated dialing, call forwarding, call termination screening, three-way calling, voice mail, etc., as well as other services. In the WWAN, such services are often provided by the serving mobile switching center (MSC). To provide such services, the MSC may execute service logic that has been provisioned into the MSC. Alternatively, the MSC may query a service control point (SCP) in which the service logic has been provisioned. The SCP then executes the appropriate service logic and provides a response that instructs the MSC how to provide the service. This latter approach is often described as the "Wireless Intelligent Network" (WIN) approach and is described in TIA/EIA/IS-771, published in July 1999, which is incorporated herein by reference.

However, a different approach may be taken to provide services via a WLAN. For example, the IP Multimedia Subsystem (IMS) architecture has been proposed to define a service architecture that supports VoIP services. The IMS approach is described in a number of technical specifications of the $3^{rd}$ Generation Partnership Project (3GPP), including TS 23.218 version 6.2.0 (2004-09), TS 23.228 version 5.12.0 (2004-03), and TS 24.229 version 6.4.0 (2004-09), which documents are incorporated herein by reference. In the IMS approach, services are provided by a call session control function (CSCF) in accordance with service logic provisioned in an application server.

Thus, although a multi-mode mobile station may be able to communicate with different wireless networks, the services provided to the multi-mode mobile station may differ for different types of wireless networks. Accordingly, there is a need for a unified approach for providing services to multi-mode mobile stations, for example, to apply services in a consistent fashion when a multi-mode mobile moves from a WWAN to a WLAN or vice versa.

SUMMARY

In a first principal aspect, an exemplary embodiment of the present invention provides a system for controlling services provided to a multi-mode mobile station. The multi-mode mobile station has a first mobile station interface for wireless communication with a first wireless network and a second mobile station interface for wireless communication with a second wireless network. The system comprises a first signaling interface for transmitting a first signaling message, a second signaling interface for transmitting a second signaling message, and a service logic module communicatively coupled to the first and second signaling interfaces. The first signaling message controls how a service is provided to the multi-mode mobile station via the first wireless network, and the second signaling message controls how a service is provided to the multi-mode mobile station via the second wireless network. The service logic module can be executed to define the first signaling message and can be executed to define the second signaling message.

In a second principal aspect, an exemplary embodiment of the present invention provides a method for monitoring a multi-mode mobile station. The multi-mode mobile station has a first mobile station interface for wireless communication with a first wireless network and a second mobile station interface for wireless communication with a second wireless network. In accordance with the method, a first message is received indicating that the multi-mode mobile has become engaged in a call via the first wireless network. In response to the first message, a call record is generated for the call, and the call record includes a start time of the call. A second message is received indicating that the call has ended while the multi-mode mobile station was in wireless communication with the second wireless network. In response to the second message, a stop time of the call is added to the call record.

DETAILED DESCRIPTION OF EXEMPLARY EMBODIMENTS

1. Overview

The present invention, in its preferred embodiments, can be used to provide services to multi-mode mobile stations in a consistent fashion via different wireless networks. In particular, the same services may be available to the multi-mode mobile station, and the services may (from the user's perspective) work in the same way, whether a multi-mode mobile station is in communication with a first wireless network or with a second wireless network, or moves between the first and wireless networks, either during a call or otherwise.

The first and second wireless networks use different wireless communication technologies. For example, the first wireless network could be a wireless local area network (WLAN) that uses a protocol such as IEEE 802.11x, HiperLAN, HomeRF, Bluetooth for wireless communication. The second wireless network could be a wireless wide area network (WWAN) that uses, for example, CDMA or GSM for wireless communication. Thus, a multi-mode mobile station may have at least a first interface for wireless communication with the first wireless network and a second interface for wireless communication with the second wireless network.

To provide services consistently, the service logic modules that define the services may be written so that they can be executed to control the provision of services in either network. For example, in an exemplary embodiment, SIP signaling is used to control how services are provided via the WLAN, and WIN signaling is used to control how services are provided via the WWAN. To enable a given service to be provided via the WLAN and the WWAN in a consistent fashion, a service logic module for the given service may be written so that it can be (i) executed to define SIP signaling that provides the service in the WLAN and (ii) can be executed to define WIN signaling that provides the same service in the WWAN. Whether a service logic module when executed defines SIP signaling or WIN signaling can depend, for example, on an input parameter specifying whether SIP signaling or WIN signaling is needed. Moreover, it is to be understood that the output from executing a service logic module may not be the SIP or WIN signaling messages themselves but, rather, parameters and/or instructions that define the content of SIP or WIN signaling messages. A SIP or WIN interface may receive the parameters and/or instructions output from the service logic module and provide the corresponding SIP or WIN signaling messages.

Accordingly, an internetwork service control system, i.e., a system for controlling services provided to multi-mode mobile stations via the WLAN and the WWAN, may include (i) a SIP interface for transmitting the SIP signaling needed to provide services in the WLAN, (ii) a WIN interface for transmitting the WIN signaling needed to provide the same services in the WWAN, and (iii) a plurality of service logic modules that can be executed to provide the SIP signaling and the WIN signaling for these services. The SIP interface, WIN interface, and service logic modules could be located in the same network element, or they could be distributed among a plurality of network elements. For example, the service logic modules and the SIP and WIN interfaces could all be in a service control point (SCP). Alternatively, the WIN interface and service logic modules to provide certain services could be located in an SCP, and the SIP interface and service logic modules to provide other services could be located in an application server. In yet another approach, the WIN interface could be in an SCP, and the SIP interface and all of the service logic modules could be in an application server.

In an exemplary embodiment, a service logic module for a given service is executed in response to one or more signaling messages that implicate that service. For example, when a service is to be provided to a multi-mode mobile station via the WLAN, a network element, such as a call session control function (CSCF) may transmit one or more SIP messages to the SIP interface of the internet service control system, e.g., an SCP. The one or more SIP messages may include one or more parameters that may, for example, identify the multi-mode mobile station, identify the service, and/or provide input for the service logic. In response, the SCP executes the appropriate service logic module, for example, using one or more input parameters from the SIP messages, to provide output parameters and/or instructions that define the SIP signaling to send in response. The SIP interface then sends one or more SIP messages to the CSCF to control how the service is provided to the multi-mode mobile station via the WLAN.

When the same service is to be provided to the multi-mode mobile station via the WWAN, a network element, such as a mobile switching center (MSC) may transmit one or more WIN invoke messages to the WIN interface of the SCP. In response, the SCP may execute the same service logic module. In this case, however, the output includes instructions and/or parameters that define the WIN signaling to send in response. The WIN interface then sends one or more WIN responses messages to the MSC to control how the service is provided to the multi-mode mobile station via the WWAN.

In an exemplary embodiment, the services that are provided via the WWAN are the same, from the multi-mode mobile station user's perspective, as the services that are provided via the WLAN. For example, if a user subscribes to an abbreviated dialing service, the same digit strings may be used for abbreviated dialing in the WLAN as in the WWAN. As another example, if a multi-mode mobile station user subscribes to a call forwarding service, then calls may be forwarded to the same number under the same conditions (e.g., busy, no-answer, or unconditional) whether the multi-mode mobile station is called via the WLAN or the WWAN.

A multi-mode mobile station may be associated with an internetwork service profile. An internetwork service profile may specify what services the user has subscribed to and, thus, available via the WLAN and the WWAN. An internetwork service profile may also specify the user's preferences regarding how those services are provided and/or may include other information. When the internetwork service control system receives a query that identifies a multi-mode mobile station, the internetwork service control system may refer to the internetwork service profile for the multi-mode mobile station to determine (i) what service or services that the multi-mode mobile station's user has subscribed to may be implicated by the query, (ii) which service logic modules or modules to execute to control the service or services, and (iii) what preferences or parameters to use when applying the service or services.

In an exemplary embodiment, the internetwork service profiles for multi-mode mobile stations are stored in a home subscriber server (HSS). The internetwork service control system may obtain the internetwork service profiles for multi-mode mobile stations from the HSS either directly or indirectly. For example, a network element, such as a CSCF, may push internetwork service profiles to the internetwork service control system. Alternatively, the internetwork service control system may request the internetwork service profile for a multi-mobile station when it receives signaling (e.g., WIN signaling from an MSC or SIP signaling from a CSCF) that identifies the multi-mode mobile station.

In addition to specifying the services that can be provided to a multi-mode mobile station via multiple wireless networks (e.g., a WLAN and a WWAN), an internetwork service profile may also include a WLAN-specific portion and a WWAN-specific portion. The WLAN-specific portion may include, for example, filtering criteria that the CSCF uses to determine what SIP signaling the CSCF should send or proxy to a service control system, and under what conditions, in order to provide the services subscribed to by the multi-mode mobile station's user.

The filtering criteria may also specify which service control system the SIP signaling should be sent or proxied to. For example, the internetwork service control system may be distributed among an SCP and an application server. Thus, the filtering criteria may specify that certain types of SIP signaling should be sent or proxied to the SCP, e.g., to control services for which the SCP has the service logic, and may specify that certain other types of SIP signaling should be sent or proxied to the application server, e.g., to control services for which the application server has the service logic. The WLAN-specific portion may also specify services that are available via the WLAN but not the WWAN. To control such services, the filtering criteria may specify that the relevant SIP signaling should be sent or proxied to a service control system other than the internetwork service control system (e.g., a WLAN-specific application server).

The WWAN-specific portion may include a trigger address list that specifies the trigger points at which the serving MSC should send a WIN invoke message to the internetwork service control system (e.g., an SCP) for call processing instructions. In an exemplary embodiment, the internetwork service profile for a multi-mode mobile station, or the WWAN-specific portion thereof, may be stored in the multi-mode mobile station's home location register (HLR). When the multi-mode mobile station registers with the WWAN, the serving MSC may retrieve the internetwork service profile, or the WWAN-specific portion of it, and store it in its visitor location register (VLR). In this way, the serving MSC is able to apply the trigger address list when processing calls originating from or terminating at the multi-mode mobile station.

The internetwork service control system may also include a call state monitor that maintains a call state of a multi-mode mobile station when the multi-mode mobile station is engaged in a call via either the WLAN or the WWAN. In this way, the call state monitor may track the multi-mode mobile station's call activity, whether that call activity involves the WLAN, the WWAN, or involves both the WLAN and the WWAN at different times during the same call. For example, a multi-mode mobile station may begin a call via the WLAN, then move to a different location such that the call is handed off to the WWAN, and end the call via the WWAN. Similarly, the multi-mode mobile station may move from the WWAN to the WLAN during a call. In such cases, the call state monitor may maintain the multi-mode mobile station's call state even though the wireless network serving the multi-mode mobile station changes during the call.

The call state monitor may maintain call state information for a multi-mode mobile station based on information contained in signaling from various network elements, such as CSCFs and MSCs. For example, a CSCF may inform the internetwork service control system if a multi-mode mobile station becomes engaged in a call via the WLAN and/or if a multi-mode mobile station ends a call via the WLAN. Similarly, an MSC may inform the internetwork service control system if a multi-mode mobile station becomes engaged in a call via the WWAN and/or if a multi-mode mobile station ends a call via the WWAN. In this way, the internetwork service control system can keep track of when calls involving multi-mode mobile stations begin and end. In addition, the CSCF may inform the internetwork service control system when handoffs from the WLAN to the WWAN or from the WWAN to the WLAN are initiated and/or completed. In this way, the internetwork service control system can keep track of which part of a multi-mode mobile station's call is carried by the WLAN and which part is carried by the WWAN.

The call state monitor may also generate call records for calls involving multi-mode mobile stations, for billing or other purposes. The call records may be in the form of call detail records (CDRs) or may include information that may be used to generate CDRs. Each call record may include a start time for the call and a stop time for the call, e.g., based on signaling from network elements, such as CSCFs and MSCs. For example, when a multi-mode mobile station becomes engaged in a call, a CSCF or MSC may send a first message to the internetwork service control system. In response, the call state monitor may generate a call record with the call start time. When the call ends, a CSCF or MSC may send a second message to the internetwork service control system. In response, the call state monitor may add the call stop time to the call record. If a multi-mode mobile station is handed off during a call, either from the WLAN to the WWAN or from the WWAN to the WLAN, then the call record may also include an indication of when the handoff occurs, e.g., when it was initiated and/or completed. In this way, a call record may indicate which part of the call was carried by the WLAN and which part was carried by the WWAN.

The internetwork service control system may store the call records in a call record store, for later retrieval by, or transmission to, a call record processing system, mediation system, or billing system. Accordingly, these call records, which cover calls via the WLAN, the WWAN, and both the WLAN and the WWAN, can beneficially facilitate the process of billing for calls originated and/or answered by multi-mode mobile stations.

2. Exemplary Network Architecture

Figure 1:
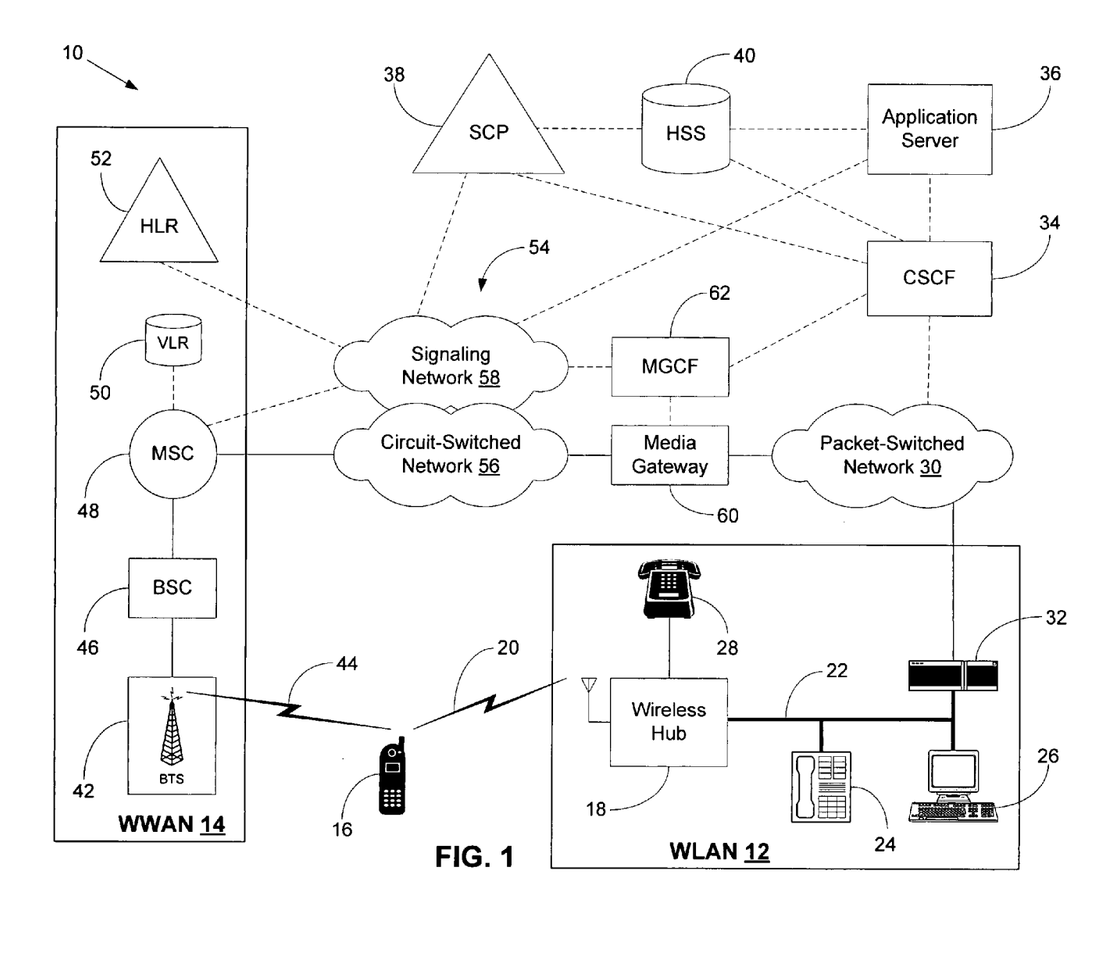
FIG. 1 is a simplified block diagram of a wireless telecommunications system, in accordance with an exemplary embodiment of the present invention.

FIG. 1 is a simplified block diagram of an exemplary wireless telecommunications system 10. In FIG. 1, connections that carry primarily voice or other media are shown as solid lines and connections that carry primarily signaling are shown as dashed lines.

Wireless telecommunications system 10 includes network elements that function together as a wireless local area network (WLAN) 12 and network elements that function together as a wireless local area network (WWAN) 14. WLAN 12 may provide wireless coverage in a relatively limited area, such as in a building or part of a building, and may use one or more unlicensed frequency bands, such as the unlicensed frequency band in the 2.4 GHz range. For example, WLAN 12 may use IEEE 802.11a, IEEE 802.11b, IEEE 802.11e, IEEE 802.11g, or IEEE 802.11h (wherein these and other members of the IEEE 802.11 family of specifications are referred to generically herein as "802.11x"), or variations thereof, for wireless communication. These 802.11x standards are incorporated herein by reference. Alternatively or additionally, WLAN 12 may use IEEE 802.16, Bluetooth, HomeRF, HiperLAN, a Multichannel Multipoint Distribution Service (MMDS), or some other wireless protocol or format for wireless communication.

WWAN 14 may provide wireless coverage in a relatively large geographic area, such as an entire city, for example, by using a plurality of contiguous wireless coverage areas, such as cells or sectors. The wireless communication in WWAN 14 may occur in an analog format, such as the Advanced Mobile Phone Service (AMPS), or in a digital format, such as code division multiple access (CDMA), time division multiple access (TDMA), or Global System for Mobile communication (GSM), and it may occur in licensed frequency bands, such as the 1.9 GHz PCS bands.

A multi-mode mobile station 16 has a first interface for wireless communication with WLAN 12 and a second interface for wireless communication with WWAN 14. Thus, multi-mode mobile station 16 is able to communicate with WLAN 12 when operating in an area served by WLAN 12 and is able to communicate with WWAN 14 when operating in an area served by WWAN 14. In some areas, the wireless coverage of WLAN 12 and WWAN 14 may be overlapping, and multi-mode mobile station 16 may use an arbitration method to determine whether to communicate with WLAN 12 or with WWAN 14.

Multi-mode mobile station 16 may be a wireless telephone, wirelessly-equipped personal digital assistant (PDA), wirelessly-equipped laptop computer, or other type of wireless communication device. The first and second interfaces of multi-mode mobile station 16 may each include an antenna, a radio frequency (RF) transceiver, and a communication module appropriate for communicating using the particular wireless technology. A communication module may be implemented by hardware, firmware, and/or software.

WLAN 12 includes at least one wireless access point. For example, WLAN 12 may include a wireless hub 18 that allows for wireless voice and/or data communications in a residential or business location. Wireless hub 18 provides a wireless coverage area within which wireless hub 18 is able to communicate with one or more wireless communication devices. Such wireless communication devices may include devices that can communicate voice information, such as multi-mode mobile station 16. Thus, FIG. 1 shows multi-mode mobile station 16 in communication with wireless hub 18 via an air interface 20. Wireless hub 18 may also communicate with other types of wireless devices, for example, with wireless-equipped laptop computers, which may communicate primarily data. In an exemplary embodiment, wireless hub 18 uses two service set identifiers (SSIDs) for wireless communications, a first SSID for communications with multi-mode mobile stations, such as multi-mode mobile station 16, and a second SSID for communications with other wireless devices. Wireless hub 18 may prioritize communications that use the first SSID to provide a higher quality of service (QoS).

Wireless hub 18 may also be communicatively coupled to devices via a local area network (LAN) 22. LAN 22 may carry voice, data, and/or other media in a packet-based format. Thus, LAN 22 may be connected to other communication devices that exchange voice in a packet-based format, such as voice-over-packet (VoP) telephone 24. LAN 22 may be also connected to devices that exchange primarily data, such as personal computer 26. LAN 22 could also be connected to one or more other wireless access points in addition to wireless hub 18.

Wireless hub 18 may also be communicatively coupled to one or more "legacy" telephony devices, such as analog telephones, digital telephones, facsimile machines, or modems. For example, FIG. 1 shows wireless hub 18 connected to analog telephone 28 as being representative of such legacy telephony devices. Wireless hub 18 may function as a media terminal adapter (MTA) for analog telephone 28, i.e., converting between the analog voice format used by analog telephone 28 and the VoP format used in WLAN 12. In this way, wireless hub 18 can be used to adapt legacy telephony devices for VoP service in WLAN 12.

LAN 22 may be communicatively coupled to a wide area packet-switched network 30, via a network access device 32. Network access device 32 could be, for example, a cable modem, DSL modem, or router. Packet-switched network 30 may route packets using a network protocol, such as the Internet Protocol (IP), in combination with the User Datagram Protocol (UDP) or Transmission Control Protocol (TCP). The IP packets may be carried over lower level protocols, such as asynchronous transfer mode (ATM) protocols. Protocols, such as the Real-Time Transport Protocol (RTP), may be used to carry voice or other media through packet-switched network 30 in a real-time format. Relevant aspects of RTP are described in Schulzrinne, et al., "RTP: A Transport Protocol for Real-Time Applications," Request for Comments 1889 (January 1996), which is incorporated herein by reference.

Other protocols, such as the Session Initiation Protocol (SIP), may be used to set up and/or manage communication sessions through packet-switched network 30. Voice, data, and/or other media may be exchanged in such communication sessions. Relevant aspects of SIP are described in Rosenberg, et al., "SIP: Session Initiation Protocol," Request for Comments 3261 (June 2002), which is incorporated herein by reference. SIP and/or other protocols may, in turn, use the Session Description Protocol (SDP) to describe the communication sessions that are being set up or managed. Relevant aspects of SDP are described in M. Handley, et al., "SDP: Session Description Protocol," Request for Comments 2327 (April 1998), which is incorporated herein by reference.

In an exemplary embodiment, SIP is used to set up communication sessions through packet-switched network 30 that involve WLAN 12. WLAN 12 may include one or more SIP user agents for this SIP signaling. For example, wireless hub 18 may include a SIP user agent to engage in SIP signaling on behalf of multi-mode mobile station 16 or other communication devices communicatively coupled to WLAN 12. Alternatively, multi-mode mobile station 16 may have its own SIP user agent.

Wireless telecommunications system 10 may use an IMS architecture to support VoP communications in packet-switched network 30 and WLAN 12. Thus, wireless telecommunications system may include a call session control function (CSCF) 34 communicatively coupled to packet-switched network 30. In accordance with the IMS approach, CSCF 34 may function as a SIP registrar for registering SIP user agents communicating from WLAN 12 and may function as a SIP proxy server for routing SIP signaling messages to and from WLAN 12.

As described in more detail below, CSCF 34 may perform these functions in accordance with service logic located in other network elements, such as application server 36 and service control point (SCP) 38. For example, CSCF 34 may send SIP signaling regarding a multi-mode mobile station to an internetwork service control system specified in the filtering criteria of the multi-mode mobile station's internetwork service profile. The internetwork service control system then executes one or more service logic modules, e.g., based on the services identified in the multi-mode mobile station's internetwork service profile, to define SIP signaling that controls how the services are to be provided and sends the SIP signaling to CSCF 34. In this way, CSCF 34 is able to provide services, such as "Class 5 features" or other enhanced call services, to devices communicating via WLAN 12, such as multi-mode mobile station 16.

CSCF 34 may also be communicatively coupled to a home subscriber server (HSS) 40. HSS 40 may store service profiles for subscribers authorized to use WLAN 12 for VoP or other services. More particularly, HSS 40 may store internetwork service profiles for subscribers authorized to use both WLAN 12 and WWAN 14. Thus, HSS 40 may store an internetwork service profile associated with multi-mode mobile station 16. HSS 40 may provide service profiles in response to queries from other network elements. For example, HSS 40 may be accessible by CSCF 34, application server 36, and SCP 38, as shown in FIG. 1, so that these network elements can retrieve service profiles from HSS 40.

WWAN 14 may include a base transceiver station (BTS) 42 that provides a wireless coverage area within which BTS 42 may communicate with one or more mobile stations, such as multi-mode mobile station 16, over an air interface 44. Although FIG. 1 shows only one BTS, it is to be understood that WWAN 14 may include a plurality of BTSs that may provide a plurality of wireless coverage areas. The communications between BTS 42 and multi-mode mobile station 16 may occur in a digital format, such as CDMA, TDMA, GSM, or they may occur in an analog format, such as AMPS. The communications could be voice only, data only (e.g., using EV-DO), or may include a combination of voice and data (e.g., using EV-DV). A preferred wireless communications format is cdma2000 such as described in EIA/TIA/IS-2000 Series, Rev. A (published March 2000), which is incorporated herein by reference.

BTS 42 may be controlled by a base station controller (BSC) 46, which, in turn, may be controlled by a mobile switching center (MSC) 48. Although FIG. 1 shows only one MSC and only one BSC, it is to be understood that WWAN 14 may include a plurality of MSCs, which may, in turn, control a plurality of BTSs, via a plurality of BSCs. MSC 48 also has access to a visitor location register (VLR) 50. VLR 50 stores WWAN profiles for mobile stations, such as multi-mode mobile station 16, that are being served by MSC 48.

A WWAN profile for a mobile station may includes a trigger address list that specifies one or more points during call processing for that mobile station at which MSC 48 should query SCP 38, e.g., using WIN signaling, for call processing instructions. In particular, a trigger address list for a multi-mode mode mobile station, such as multi-mode mobile station 16 may include one or more WIN "Pre-Paid" triggers, such as Origination_Attempt_Authorized, Calling_Routing_Address_Available, O_Answer, O_Disconnect, T_Answer, and T_Disconnect. The trigger address list may also include other triggers. When MSC 48 encounters a trigger in the trigger address list for a multi-mode mobile station while processing a call to or from the multi-mode mobile station, MSC 48 sends a corresponding WIN invoke message to SCP 38 to obtain call processing instructions. In this way, SCP 38 is able to control how MSC 48 provides services to multi-mode mobile stations via WWAN 14, e.g., in accordance with service logic in SCP 38 or in another network element.

A home location register (HLR) 52 may store WWAN profiles for multi-mode mobile stations, such as multi-mode mobile station 16. VLR 50 may obtain the WWAN profile for a multi-mode mobile station from HLR 52, e.g., when the multi-mode mobile station registers with WWAN 14, via MSC 48. A WWAN profile for a multi-mode mobile station may include some or all of the same information as the internetwork service profile for the multi-mode mobile station stored in HSS 40. For example, a WWAN profile may be a WWAN-specific portion of an internetwork service profile.

HLR 52 may also perform mobility management functions for multi-mode mobile station. In this regard, HLR 52 may maintain a locator address for multi-mode mobile stations, e.g., based on the most recent registration information that HLR 52 has received. A locator address may use an MSCID to specify a location. In some cases, the MSCID may correspond to an actual MSC. For example, when multi-mode mobile station 16 registers with WWAN 14 via MSC 48, HLR 52 may use an MSCID of MSC 48 to specify the location of multi-mode mobile station 16. In other cases, the MSCID may correspond to another type of network element. For example, when multi-mode mobile station 16 registers with CSCF 34 via WLAN 12, application server 36 may send HLR 52 a registration message with an MSCID that identifies application server 36 in order to specify the location of multi-mode mobile station 16.

MSC 48 is connected to public switched telephone network (PSTN) 54. PSTN 54 may use an out-of-band signaling system, such as Signaling System 7 (SS7) to route calls. Thus, PSTN 54 may include a circuit-switched network 56 that carries bearer traffic, i.e., the voice or other media in calls, and a signaling network 58 that carries signaling traffic used to set up, tear down, monitor, and control calls. Circuit-switched network 56 may include a plurality of trunks, with each trunk carrying media in a time division multiplex (TDM) format. Signaling network 58 may include a plurality of networked signal transfer points (STPs).

MSC 48 may communicate with signaling network 58, e.g., using SS7, to route calls via circuit-switched network 56 to and from mobile stations being served by WWAN 14, such as multi-mode mobile station 16. MSC 48 may also communicate with HLR 52, e.g., using IS-41 signaling, and with SCP 38, e.g., using WIN signaling, via signaling network 58. The IS-41 and WIN signaling may be carried in signaling network 58 as an SS7 application layer.

Packet-switched network 30 may be communicatively coupled to circuit-switched network 56, via a media gateway 60. Media gateway 60 may convert between media formats used in circuit-switched network 56 and packet-switched network 30. For example, media gateway 60 may receive media from circuit-switched network 56 in a TDM format and convert the media into an RTP format for transmission over packet-switched network 30, and vice-versa.

Media gateway 60 may be controlled by a media gateway control function (MGCF) 62 via a signaling link, e.g., using the Media Gateway Control Protocol (MGCP) or H.248/Megaco. MGCF 62, may, in turn, be controlled by CSCF 34 via a signaling link, e.g., using SIP signaling. MGCF 62 may also be communicatively coupled to signaling network 58 so as to engage in SS7 signaling to route calls through circuit-switched network 56. In this way, MGCF 62 may manage communication sessions through media gateway 60, e.g., to extend calls from PSTN 54 through media gateway 60 to packet-switched network 30, and vice versa.

3. Exemplary Internetwork Service Control System

Figure 2:
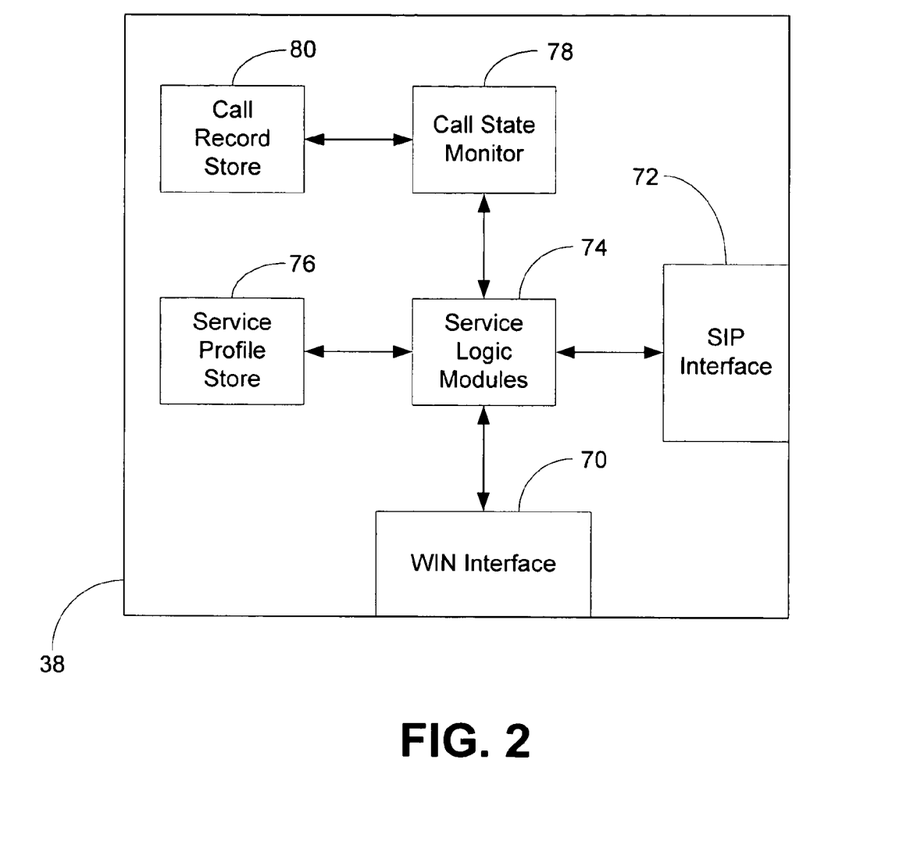
FIG. 2 is a simplified block diagram of an internetwork service control system, in accordance with an exemplary embodiment of the present invention.

Wireless telecommunications system 10 includes an internetwork service control system that controls how services are provided to multi-mode mobile stations via WLAN 12 and via WWAN 14. In an exemplary embodiment, SCP 38 functions as the internetwork service control system, as shown in FIG. 2. It is to be understood, however, that network elements other than SCP 38 may function as the internetwork service control system, e.g., application server 36. Alternatively, the internetwork service control system may be distributed among multiple network elements. For example, SCP 38 and application server 36 may function together as the internetwork service control system, e.g., with service logic modules for some services in SCP 38 and service logic modules for other services in application server 36.

With reference to FIG. 2, SCP 38, as the internetwork service control system, may include a WIN interface 70 and a SIP interface 72, which are coupled to a plurality of service logic modules 74. WIN interface 70 transmits and receives WIN signaling, for example, WIN signaling with MSC 48 via signaling network 58. SIP interface 72 transmits and receives SIP signaling, for example, SIP signaling with CSCF 34. Service logic modules 74 include the service logic for controlling services provided to multi-mode mobile stations, such as multi-mode mobile station 16, via WLAN 12 and WWAN 14.

In an exemplary embodiment, service logic modules 74 can be executed to define WIN signaling to control the provision of services to multi-mode mobile stations via WLAN 12 and can be executed to define SIP signaling to control the provision of the same services to multi-mode mobile stations via WWAN 14. For example, WIN interface 70 may receive WIN signaling, extract parameters therefrom, and pass the parameters to service logic modules 74. The appropriate ones of service logic modules 74 are then executed to define instructions and/or parameters, from which WIN interface generates responsive WIN signaling. SIP interface 72 may function in a similar manner with respect to SIP signaling. In this way, the same service logic modules can be used to provide the same services that work in the same way (from the user's perspective) in both WLAN 12 and WWAN 14.

Service logic modules 74 may be coupled to a service profile store 76. Service profile store 76 stores internetwork service profiles for multi-mode mobile stations, e.g., multi-mode mobile stations for which SCP 38 is controlling services. Such multi-mode mobile stations may be identified in the WIN signaling or SIP signaling that SCP 38 receives. For example, when SCP 38 receives WIN or SIP signaling that identifies a multi-mode mobile station for which services may be provided, SCP 38 may check whether the internetwork service profile is already stored in service profile store 76. If it is not, then SCP 38 may retrieve the internetwork service profile, for example, by querying HSS 40. In some cases, the internetwork service profile may be pushed to SCP 38. For example, when CSCF 34 sends SIP signaling regarding a multi-mode mobile station to SCP 38, CSCF 34 may also send the multi-mode mobile station's internetwork service profile.

The internetwork service profile for a multi-mode mobile station may specify what services the multi-mode mobile station has available and, thus, may determine which of service logic modules 74 are executed in response to WIN or SIP signaling that identifies the multi-mode mobile station. Internetwork service profiles may also include information that is needed to determine how to provide services to multi-mode mobile stations. As one example, an internetwork service profile for a multi-mode mobile station may specify the full directory numbers that correspond to the abbreviated digit strings that the multi-mode mobile station uses for abbreviated dialing. As another example, an internetwork service profile for a multi-mode mobile station may specify what directory number to forward calls to in a call forwarding service and under what conditions (e.g., busy, no-answer, or unconditional).

SCP 38, as the internetwork service control system, may also include a call state monitor 78, e.g., coupled to service logic modules 74. Call state monitor 78 maintains the state of calls involving multi-mode mobile stations, e.g., by generating call records. In particular, call state monitor 78 may generate a call record with a call start time when a multi-mode mobile station becomes engaged in a call via either WLAN 12 or WWAN 14. When the call ends, call state monitor 78 may add a call stop time to complete the call record. Call state monitor 78 may also add an indication to call record when a handoff occurs from WLAN 12 to WWAN 14 or from WWAN 14 to WLAN 12.

WIN or SIP signaling may inform SCP 38 of when calls involving multi-mode mobile stations begin, when they end, and when handoffs occur. For example, for calls via WLAN 12, CSCF 34 may receive a SIP ACK message when a communication session involving a multi-mode mobile station has been successfully established and may receive a SIP BYE message the communication session ends. CSCF 34 may push these messages to SCP 38, and call state monitor 78 may act in response. Similarly, for calls via WWAN 14, MSC 48 may send SCP 38 an OAnswer or a TAnswer invoke message when a call involving a multi-mode mobile station begins and may send SCP 38 an ODisconnect or a TDisconnect invoke message when the call ends.

Call state monitor 78 may store the call records that it generates in a call record store 80. Although FIG. 2 shows call record store 80 as being part of SCP 38, it is to be understood that call record store 80 could be located in a different network element, i.e., outside of the internetwork service control system. Call record store 80 may periodically transmit stored call records to a call record processing system, mediation system, or billing system, e.g., for billing purposes. Alternatively, a call record processing system, mediation system, or billing system may periodically retrieve call records stored in call record store 80. In this way, the information needed to bill subscribers for services via WLAN 12 and WWAN 14 can beneficially come from one, centralized location.

4. Exemplary Operation

Figure 3:
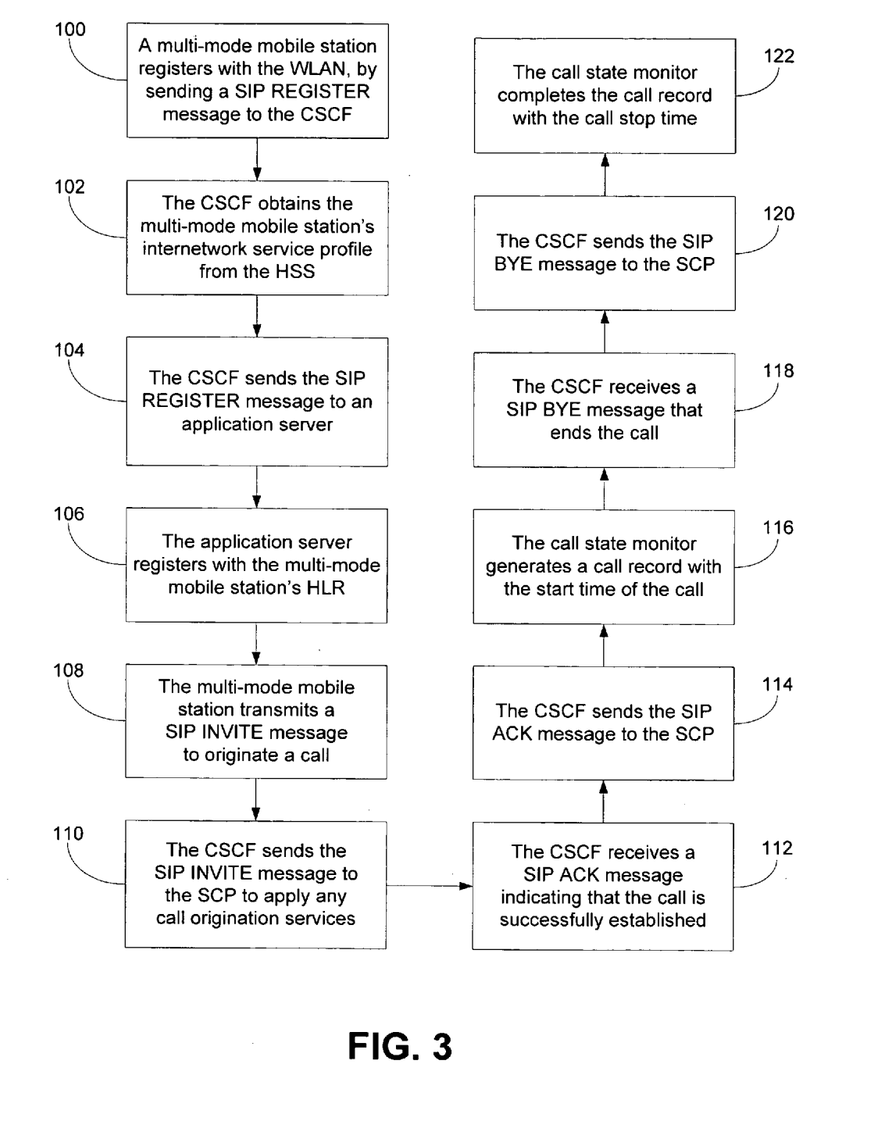
FIG. 3 is a flow chart illustrating a method for controlling the provision of services to a multi-mode mobile station via a WLAN, accordance with an exemplary embodiment of the present invention.
Figure 4:
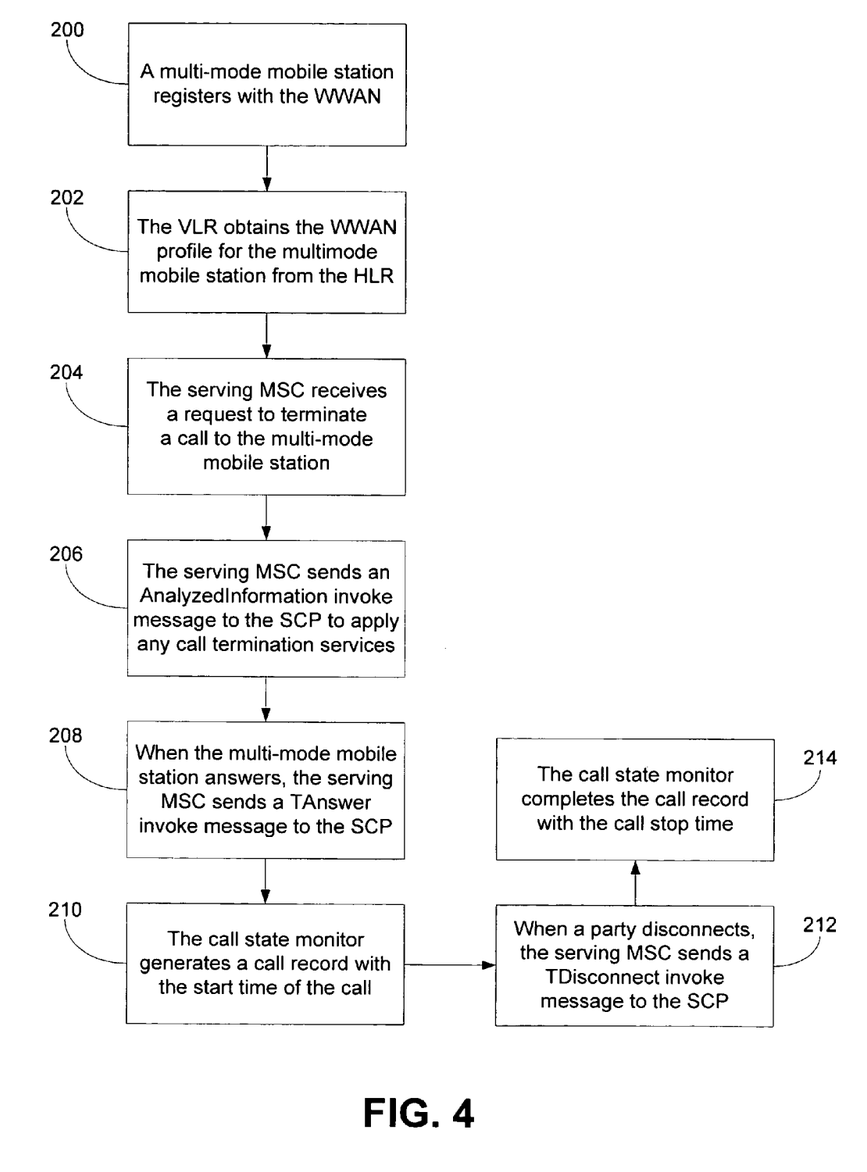
FIG. 4 is a flow chart illustrating a method for controlling the provision of services to a multi-mode mobile station via a WWAN, in accordance with an exemplary embodiment of the present invention.
Figure 5:
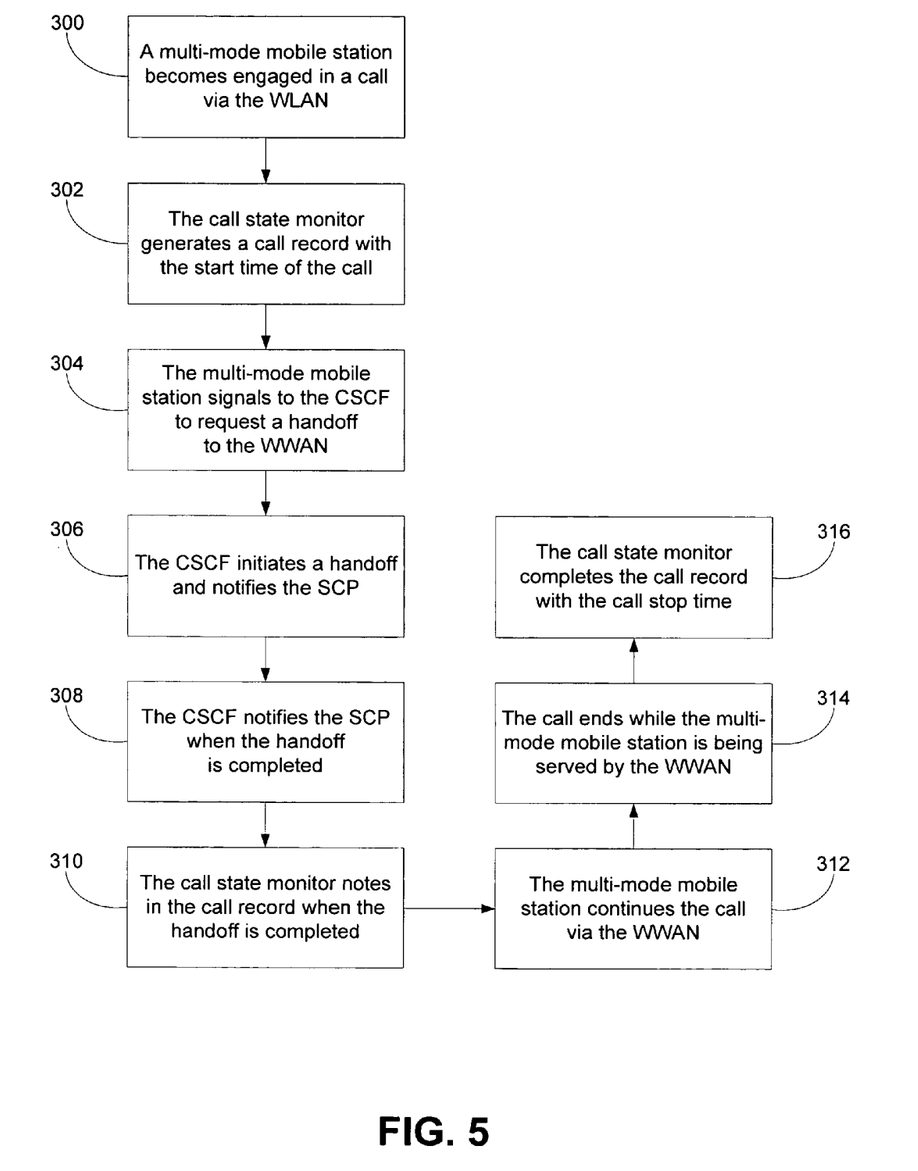
FIG. 5 is a flow chart illustrating a method for maintaining the call state of a multi-mode mobile station when the multi-mode mobile station moves from a WLAN to a WWAN, in accordance with an exemplary embodiment of the present invention.

FIGS. 3-5 are flow charts illustrating exemplary methods of operation. FIG. 3 illustrates an example in which a multi-mode mobile station originates a call via WLAN 12. FIG. 4 illustrates an example in which a call is terminated to a multi-mode mobile station via WWAN 14. FIG. 5 illustrates an example in which the multi-mode mobile station moves from WLAN 12 to WWAN 14 during a call. The examples of FIGS. 3-5 assume the network architecture of FIG. 1 and assume that SCP 38 serves as the internetwork service control system. However, it is to be understood that other network architectures could be used and that the internetwork service control system could comprise network elements other than SCP 38.

With reference to FIG. 3, an exemplary process may begin when multi-mode mobile station 16 registers with WLAN 12, e.g., by sending a SIP REGISTER message to CSCF 34, as indicated by block 100. In response to receiving the SIP REGISTER message, CSCF 34 obtains the internetwork service profile of multi-mode mobile station 16 from HSS 40, as indicated by block 102. The CSCF 34 also sends the SIP REGISTER message to application server 36, as indicated by block 104.

Application server 36 may then register the location of multi-mode mobile station 16 with HLR 52, as indicated by block 106. For example, application server 36 may transmit an IS-41 Registration Notification (REGNOT) message to HLR 52 via signaling network 58. The IS-41 REGNOT message may use an MSCID associated with application server 36 to identify the location of multi-mode mobile station 16. In response to the IS-41 REGNOT message, application server 36 may receive a WWAN profile for multi-mode mobile station 16, which application server 36 may store in an "IP VLR." In this way, application server 36 can appear as an MSC to HLR 52, i.e., for purposes of IS-41 signaling. This, in turn, can allow HLR 52 to manage the mobility of multi-mode mobile station 16, even though multi-mode mobile station 16 is being served by WLAN 12 rather than by WWAN 14.

At some point, multi-mode mobile station 16 may transmit a SIP INVITE message to originate a call via WLAN 12, as indicated by block 108. CSCF 34, acting as a SIP proxy server, receives the SIP INVITE message. CSCF 34 then applies the filtering criteria from the internetwork service profile of multi-mode mobile station 16 to determine whether the SIP INVITE message should be sent to another network element to apply any call origination services. For example, the user of multi-mode mobile station 16 may subscribe to a service, for both WLAN 12 and WWAN 14, that blocks calls to certain directory numbers. In that case, the filtering criteria may specify that the SIP INVITE should be sent to the internetwork service control system, i.e., to SCP 38. Thus, CSCF 34 may send the SIP INVITE message to SCP 38 to apply any call origination services, as indicated by block 110. Similarly, if the SIP INVITE that CSCF 34 received were from an endpoint that was inviting a communication session with multi-mode mobile station 16, then CSCF 34 would send the SIP INVITE to SCP 38 to apply any call termination services.

When SCP 38 receives the SIP INVITE message, it executes one or more of service logic modules 74, based on the services that the user of multi-mode mobile station 16 subscribes to, e.g., as specified in the internetwork service profile for multi-mode mobile station 16. The internetwork service profile may be included in the SIP signaling that CSCF 34 sent, or SCP 38 may obtain the internetwork service profile by querying HSS 40. When the appropriate service logic is executed, SIP signaling is defined to control how the relevant services are to be provided to multi-mode mobile station 16. SCP 38 sends this SIP signaling to CSCF 34, and CSCF 34 acts accordingly. In this way, CSCF 34 is able to provide any call origination services that may apply.

If the call that multi-mode mobile station 16 originated is successfully established, then CSCF 34 may receive a SIP ACK message from multi-mode mobile station 16, as indicated by block 112. In response, CSCF 34 sends the SIP ACK message to SCP 38, as indicated by block 114. When SCP 38 receives the SIP ACK message, service logic may recognize that a new call involving multi-mode mobile station 16 has been established via WLAN 12. The service logic may pass this information, e.g., an identification of multi-mode mobile station 16 and a timestamp from the SIP ACK message, to call state monitor 78, which then generates a call record for the call, as indicated by block 116. The call record includes a start time of the call, e.g., based on the timestamp from the SIP ACK message.

At some point, either multi-mode mobile station 16 or the called endpoint ends the call, e.g., by transmitting a SIP BYE message. CSCF 34 receives the SIP BYE message, as indicated by block 118. To enforce the call state monitoring role of the internetwork service control system, CSCF sends the SIP BYE message to the SCP 38, as indicated by block 120. In response, call state monitor 78 completes the call record for the call, as indicated by block 122. In so doing, call state monitor 78 adds a stop time of the call, e.g., based on information contained in the SIP BYE message.

As illustrated in FIG. 4, through the use of appropriate WIN triggers, SCP 38, as the internetwork service control system, can also control the provision of services to multi-mode mobile station 16 via WWAN 14 and can monitor its call state. The process may begin when multi-mode mobile station 16 registers with WWAN 14, as indicated by block 200. For example, multi-mode mobile 16 may transmit a register message, and MSC 48 may send an IS-41 REGNOT message to HLR 52.

In response to the IS-41 REGNOT message, VLR 50 obtains the WWAN profile for multi-mode mobile station 16 from HLR 52, as indicated by block 202. The WWAN profile includes a trigger address list that specifies certain conditions during processing calls to or from multi-mode mobile station 16 when MSC 48 should query SCP 38 for instructions. In particular, the trigger address list includes triggers that allow SCP 38 to control the provision of services to multi-mode mobile station 16 via WWAN 14 and that keep SCP 38 informed of the call state of multi-mode mobile station 16.

At some point, the MSC serving multi-mode mobile station 16, i.e., MSC 48 in this example, receives a request to terminate a call to multi-mode mobile station 16, as indicated by block 204. This request corresponds to a trigger condition specified in the trigger address list for multi-mode mobile station 16. In response to this trigger condition, MSC 48 sends an AnalyzedInformation invoke message to SCP 38 to apply any call termination services, as indicated by block 206. Such call termination services could include, for example, call screening or call forwarding services. When SCP 38 receives the AnalyzedInformation invoke message, SCP 38 obtains the internetwork service profile for multi-mode mobile station 16, e.g., by querying HSS 40, and executes the appropriate service logic for any call termination services that the user of multi-mode mobile station 16 has subscribed to. SCP 38 then sends MSC 48 a response that instructs MSC 48 what to do to provide any applicable call termination services.

For purposes of illustration, this example will assume that SCP 38 has instructed MSC 48 to simply terminate the call to multi-mode mobile station 16. When multi-mode mobile station 16 answers, MSC 48 encounters another trigger condition and responsively sends a TAnswer invoke message to SCP 38, as indicated by block 208. In this way, SCP 38 is informed when multi-mode mobile station 16 becomes engaged in a call via WWAN 14. In response to the TAnswer invoke message, call state monitor 78 generates a call record for the call, as indicated by block 210. The call record includes the start time of the call, e.g., based on information contained in the TAnswer message.

At some point during the call, one of the parties (either the calling party or multi-mode mobile station 16) hangs up or otherwise becomes disconnected. The disconnection event corresponds to a trigger point in the trigger address list for multi-mode mobile station 16. Thus, MSC 48 responsively sends a TDisconnect invoke message to SCP 38, as indicated by block 212. SCP 38 receives the TDisconnect message, and call state monitor 78 responsively completes the call record, as indicated by block 214. In so doing, call state monitor 78 adds the call stop time to the call record, e.g., based on information contained in the TDisconnect message.

As illustrated in FIGS. 3 and 4, SCP 38, as the internetwork service control system, can control the provision of services to multi-mode mobile station 16 via WLAN 12 and WWAN 14. Although the example of FIG. 3 is directed to call origination services and the example of FIG. 4 is directed to call termination services, it is to be understood that SCP 38 can control the provision of call origination services, call termination services, and/or other types of services, via WLAN 12 and WWAN 14. Moreover, to control the provision of these services, SCP 38 may execute the same service logic when multi-mode mobile station 16 is being served by WLAN 12 as when multi-mode mobile station 16 is being served by WWAN 14.

In addition, SCP 38 can monitor the call state of multi-mode mobile station 16, whether multi-mode mobile station 16 is engaged in a call via WLAN 12 or WWAN 14 or moves between WLAN 12 and WWAN 14 during a call. In particular, a handoff from WLAN 12 to WWAN 14 or from WWAN 14 to WLAN 12 may be effected while multi-mode mobile station 16 is engaged in a call. In such cases, SCP 38 may still maintain the call state of multi-mode mobile station 16, as multi-mode mobile station 16 is handed off from WLAN 12 to WWAN 14 or vice versa.

For example, FIG. 5 illustrates a case in which the call is handed off from WLAN 12 to WWAN 14. In an initial step, multi-mode mobile station 16 becomes engaged in a call via WLAN 12, as indicated by block 300. In response, call state monitor 78 generates a call record that includes the call start time, as indicated by block 302. In particular, CSCF 34 may receive a SIP ACK message indicating that a call involving multi-mode mobile station 16 is being established via WLAN 12, and CSCF 34 may forward this message to SCP 38 so as to notify call state monitor 78.

At some point during the call, multi-mode mobile station 16 signals to CSCF 34 to request a handoff to WWAN 14, as indicated by block 304. This may occur, for example, when multi-mode mode mobile station 16 moves out of the wireless coverage area of WLAN 12 and into the wireless coverage area of WWAN 14, multi-mode mobile station 16 may detect that the signal strength from wireless hub 18 has decreased and that wireless coverage from BTS 42 is available. Based on these signal strength measurements and on logic provisioned into multi-mode mobile station 16, multi-mode mobile station 16 may determine that WWAN 14 is available and preferred over WLAN 12.

In response to the request from multi-mode mobile station 16, CSCF 34 may initiate a handoff to WWAN 12, as indicated by block 306. To initiate the handoff, CSCF 34 may send a SIP INVITE message to a network element, e.g., to MSCF 62 or to a media resource server, which, in turn, engages in IS-41 signaling, i.e., playing the role of an MSC, to effect an inter-system handoff to MSC 48. A new session is established via WWAN 14 after which multi-mode mobile station 16 drops the original session carried by WLAN 12. In this way, a call handoff may be effected from WLAN 12 to WWAN 14.

CSCF 34 may also notify SCP 38 when the handoff process is initiated, as indicated by block 306, e.g., by sending a SIP message. In response, call state monitor 78 may record an indication in the call record for multi-mode mobile station 16 that it is being handed off to WWAN 14. Similarly, when the handoff is completed, CSCF 34 may notify SCP 38, as indicated by block 308, e.g., by sending a SIP message. In response, call state monitor 78 may note in the call record for multi-mode mobile station 16 the time when the handoff is completed, as indicated by block 310. In this way, the call record generated for multi-mode mobile station 16 may indicate which part of the call is carried by WLAN 12 and which part is carried by WWAN 14. This can be useful, for example, if services in WLAN 12 are billed differently than in WWAN 14.

After the handoff, multi-mode mobile station 16 continues the call via WWAN 14, as indicated by block 312. At some point, while multi-mode mobile station 16 is being served by WWAN 14, the call ends, as indicated by block 314. In response, call state monitor 78 completes the call record with the call stop time, as indicated by block 316. More particularly, when a party to the call disconnects while multi-mode mobile station 16 is being served by MSC 48, MSC 48 may transmit an ODisconnect or TDisconnect invoke message to SCP 38 so as to inform call state monitor 78 that the call has ended. Call state monitor 78 may identify the call record that was already generated for multi-mode mobile station 16, e.g., based on an identification of multi-mode mobile station 16 contained in the WIN invoke message from MSC 48. Call state monitor 78 may also identify a call stop time based on the information contained in the WIN invoke message. Call state monitor 78 then adds the call stop time to the call record for multi-mode mobile station 16 and stores the completed call record in call record store 80. In this way, SCP 38 has generated a call record, which can beneficially be used for billing purposes, that includes the call activity of multi-mode mobile station 16 in both WLAN 12 and WWAN 14.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A system for controlling services provided to a multi-mode mobile station, said multi-mode having a first mobile station interface for wireless communication with a first wireless network and a second mobile station interface for wireless communication with a second wireless network, said system comprising:
   a first signaling interface for transmitting a first signaling message, wherein said first signaling message controls how a service is provided to said multi-mode mobile station via said first wireless network;
   a second signaling interface for transmitting a second signaling message, wherein said second signaling message controls how said service is provided to said multi-mode mobile station via said second wireless network, said first and second signaling messages having different formats; and
   a service logic module communicatively coupled to said first signaling interface and to said second signaling interface, wherein said service logic module can be executed to define said first signaling message and can be executed to define said second signaling message, and wherein said first and second signaling interfaces and said service logic module are in a service control point (SCP).

2. The system of claim 1, wherein said first wireless network is a wireless wide area network (WWAN) and said second wireless network is a wireless local area network (WLAN).

3. The system of claim 2, wherein said first signaling message is an IS-41 message and said second signaling message is a Session Initiation Protocol (SIP) message.

4. The system of claim 3, further comprising:
a mobile switching center (MSC) communicatively coupled to said first signaling interface, wherein said MSC functions to provide said service to said multi-mode mobile station via said first wireless network in accordance with said first signaling message.

5. The system of claim 3, further comprising:
a call session control function (CSCF) communicatively coupled to said second signaling interface, wherein said CSCF functions to provide said service to said multi-mode mobile station via said second wireless network in accordance with said second signaling message.

6. The system of claim 1, further comprising:
a home subscriber server (HSS) communicatively coupled to said SCP, wherein said SCP obtains a service profile for said multi-mode mobile station from said HSS.

7. The system of claim 1, wherein said SCP includes a call state monitor that maintains a call state of said multi-mode mobile station when said multi-mode mobile station is engaged in a call via either of said first and second wireless networks.

8. The system of claim 1, wherein said SCP generates a call record when said multi-mode mobile station is engaged in a call via either of said first and second wireless networks.

9. The system of claim 8, wherein said call record includes a start time of said call and a stop time of said call.

10. The system of claim 9, wherein said start time occurs when said multimode mobile station becomes engaged in said call via said first wireless network and said stop time occurs after said multi-mode mobile station has been engaged in said call via said second wireless network.

11. The system of claim 9, wherein said start time occurs when said multimode mobile station becomes engaged in said call via said second wireless network and said stop occurs after said multi-mode mobile station has been engaged in said call via said first wireless network.

* * * * *